United States Patent [19]

Hatayama

[11] Patent Number: 4,682,243
[45] Date of Patent: Jul. 21, 1987

[54] MAGNIFICATION RATIO CONVERSION IN IMAGE REPRODUCTION

[75] Inventor: Fumihiro Hatayama, Kyoto, Japan

[73] Assignee: Dainippon Screen Mfg. Co., Ltd., Kyoto, Japan

[21] Appl. No.: 716,686

[22] Filed: Mar. 27, 1985

[30] Foreign Application Priority Data

Mar. 30, 1984 [JP] Japan .................................. 59-64657

[51] Int. Cl.⁴ .............................................. H04N 1/04
[52] U.S. Cl. ..................................... 358/287; 358/77; 382/47
[58] Field of Search ........................... 358/287, 78, 77; 382/47

[56] References Cited

U.S. PATENT DOCUMENTS

| 4,163,605 | 8/1979 | Yamada ................................ 358/287 |
| 4,305,093 | 12/1981 | Nasu .................................... 358/287 |
| 4,327,380 | 4/1982 | Yamada et al. ..................... 358/287 |
| 4,454,537 | 6/1984 | Okada et al. ........................ 358/287 |
| 4,470,074 | 9/1984 | Yamada .............................. 358/287 |
| 4,521,812 | 6/1985 | Knop .................................... 358/287 |
| 4,605,957 | 8/1986 | Yamada .............................. 358/287 |

FOREIGN PATENT DOCUMENTS

0095514 7/1983 European Pat. Off. .
0085351 10/1983 European Pat. Off. .

Primary Examiner—Edward L. Coles, Sr.
Attorney, Agent, or Firm—Lowe Price LeBlanc Becker & Shur

[57] ABSTRACT

In reproducing images in a desired magnification ratio by storing in a memory image data obtained from an original and reading out the data from the memory, moiré patterns are reduced by a sampling frequency constant in accordance with a magnification ratio that yields good reproduction quality. Image data synchronized with the sampling frequency are averaged among a number of pixels corresponding to the desired magnification ratio, for storage.

9 Claims, 6 Drawing Figures

MAGNIFICATION RATIO CONVERSION IN IMAGE REPRODUCTION

TECHNICAL FIELD

The present invention relates to magnification ratio conversion in electronic image reproduction, and more particularly to a method of and system for reducing moiré in variable magnification ratio, electronic, image reproduction systems.

BACKGROUND ART

It is well known that in electronic image reproduction processing, an image signal obtained by scanning an original synchronized with a sampling clock pulse signal of a specific frequency is, after undergoing an A/D conversion, written into a memory device and then read out therefrom, to be submitted to a subsequent recording process.

There are three principal methods of providing image magnification ratio conversion in the main scanning direction. One method is disclosed in U.S. patent application Ser. No. 924,928, filed on 7-17-78, now abandoned in which the speed of revolution of a recording drum is maintained constant and that of an input drum is made variable according to a predetermined magnification ratio. An original image signal picked up each scanning line is synchronized to a memory write clock pulse signal which is of the same frequency as that of a memory read clock pulse signal. The read and write pulse signals are applied to a memory corresponding to an output of an encoder (or equivalent) that is coaxially connected to an output drum. The memory is read out in synchronism with a read clock pulse signal having a predetermined frequency and phase relative to the reading clock pulse signal, for recording a reproduction image of the predetermined magnification ratio and at a predetermined position.

In another method disclosed in U.S. Pat. No. 3,272,918, the speeds of revolution of an input drum and a recording drum are constant (usually both are the same) independent of the magnification ratio. The frequency ratio of a writing clock pulse signal and a reading clock pulse signal for a memory is varied according to the predetermined magnification ratio with the former being normally at a higher frequency than the latter.

In the third method disclosed in U.S. Pat. No. 4,163,605, U.S. patent application Ser. No. 933,714, and JP Patent Laid Open No. 54-65601, with the speeds of revolution of an input drum and a recording drum being maintained constant independent of magnification ratio, the frequency ratio between the memory write and read clock pulse signals is at unity. The main scanning addresses of the memory are omitted or overlapped in part when image data stored in the memory are read out to be used for recording an enlarged or reduced reproduction image.

In each of the above-mentioned methods, there is observed the appearance of moiré, which is a kind of interference between the sampling and reading frequencies of a memory when the former is substantially lower than the latter.

The word "substantially" is used as follows: Even when the writing frequency is equal to the reading frequency in the first example above, the pitch between adjacent sampling areas of the original image is increased in conformity to the increase of speed of revolution of the input drum.

Assuming that in the third example the image data of every second pixel obtained at the input side are applied to the recording side, because the same effect can be brought forth by causing the writing frequency to be half of the reading frequency, the writing frequency is regarded as being reduced by one-half.

Under such circumstances, a process has recently been introduced for reducing moiré by varying the diameter of an input scanning beam employed.

However, in order to obtain image data accurately in a lower magnification ratio of image reproduction, a broader aperture must be used in association with increasing the diameter of the beam. However, such an input beam of increased diameter is not compatible with a narrower aperture because of the lack of intensity thereof in the aperture. Therefore, it is also necessary to vary the size of the aperture as well as the diameter of the beam in accordance with changes in the image reproduction magnification ratio. Because such systems are complex, it is difficult to economically produce an aperture and a beam capable of automatically following variations in image reproduction magnification ratio.

DISCLOSURE OF THE INVENTION

Accordingly, it is an object of the present invention to provide an improved method and apparatus for controlling magnification ratio in an image reproduction system.

Another object is to provide a method and apparatus for reducing moiré in a variable ratio image reproduction system.

A further object of the invention is to provide a method and apparatus for reducing the aperture size control requirement in a variable ratio image reproduction system.

Briefly, the frequency of a sampling pulse signal and the size of an aperture are initially adjusted in accordance with a magnification ratio appropriate for obtaining a better reproduction image, while a proportional relation is established between a memory write pulse signal and the sampling frequency. Then image data obtained from an original image averaged every several pixels corresponding to the predetermined magnification ratio and synchronized with the sampling pulse are stored in the memory. By establishing such a relation between the writing frequency and the sampling frequency and taking an average of the image data of several pixels, the relation between the sampling frequency and a reading frequency can be made constant, independent of magnification ratio. Therefore, since there is no need to reduce the sampling frequency to below a lower magnification ratio, the appearance of moiré can be significantly reduced.

The above-mentioned method carries out data averaging by averaging present pixel image data and the image data of several previous pixels. Because this method necessitates a divider to derive the average, which is expensive, however, the following method may be employed.

The ratio between a reference pulse signal of a constant frequency and that of a writing pulse signal is varied according to a magnification ratio to be determined. Image data are thereby sampled synchronously with a sampling pulse of a frequency $2^r$ times the frequency of the writing pulse signal, where r is an integer $\geq 0$. Then the thus-obtained digital image data, after being summed $2^r$ times are averaged by being shifted r times in a shift register.

The above and other objects and features of this invention can be appreciated more fully from the following detailed description when read with reference to the accompanying drawings.

BEST MODE FOR PRACTICING THE INVENTION

In an image reproducing process having a fixed ratio between the speeds of revolution of an input drum and the recording drum, the frequency ratio between memory write and read pulse signals is varied according to a predetermined magnification ratio. The relations among a main scanning direction magnification ratio M, the frequency $f_{in}$ of the write pulse signal $P_{in}$ and the frequency $f_{out}$ of the read pulse signal $P_{out}$ can be expressed as:

$$K_1 M = f_{in}/f_{out} \qquad (1)$$

or $$f_{in} = K_1 M f_{out}$$

wherein $K_1$ is a constant.

Assuming in this connection that the write frequency $f_{in}$ and a sampling frequency $f_s$ have the relation:

$$f_{in} = K_2 M f_s \qquad (2)$$

wherein $K_2$ is a constant, it can be derived from equations (1) and (2) that:

$$f_s/f_{out} = K_1/K_2 \qquad (3)$$

Thus, the ratio between the sampling frequency $f_s$ and the memory read frequency $f_{out}$ can be maintained constant by varying the memory write frequency. Therefore, assuming that the read frequency $f_{out}$ is kept constant, both the sampling frequency $f_s$ and the read frequency $f_{out}$ can be determined as functions of one another.

It should be noted at this juncture that, according to equation (2), the variation of the write frequency $f_{in}$ with a fixed sampling frequency $f_s$ prevents putting of sampled image data into a memory when $K_2 M$ is smaller than unity 1 because the write frequency $f_{in}$ becomes lower than the sampling frequency. Therefore in the present invention, sampled image data being put into a memory are averaged every several pixels according to a magnification ratio determined to avoid reducing the sampling frequency excessively.

Figure 1:
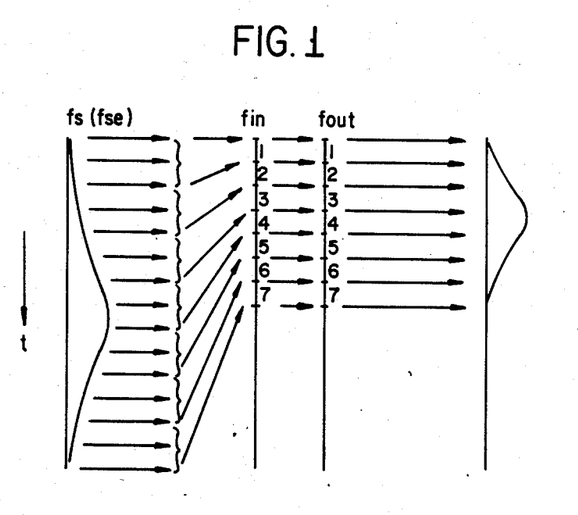
FIG. 1 is a chart showing the relation between sampling frequency, writing frequency and reading frequency for a memory in a magnification conversion process of the present invention.

Further, with reference to FIG. 1, the frequency $f_s$ of a sampling pulse signal $P_s$ is maintained constant at a high value. In practice the value $K_1/K_2$ of the equation (3) is determined to be, for example, 5 or 10 even when the magnification ratio is reduced. Then image data sampled by the sampling pulse signal $P_s$ are averaged every several pixels to be new image data, which are put into specific addresses of the memory according to the writing pulse signal $P_{in}$ of frequency $f_{in}$ and read out according to the constant reading frequency.

Figure 2:
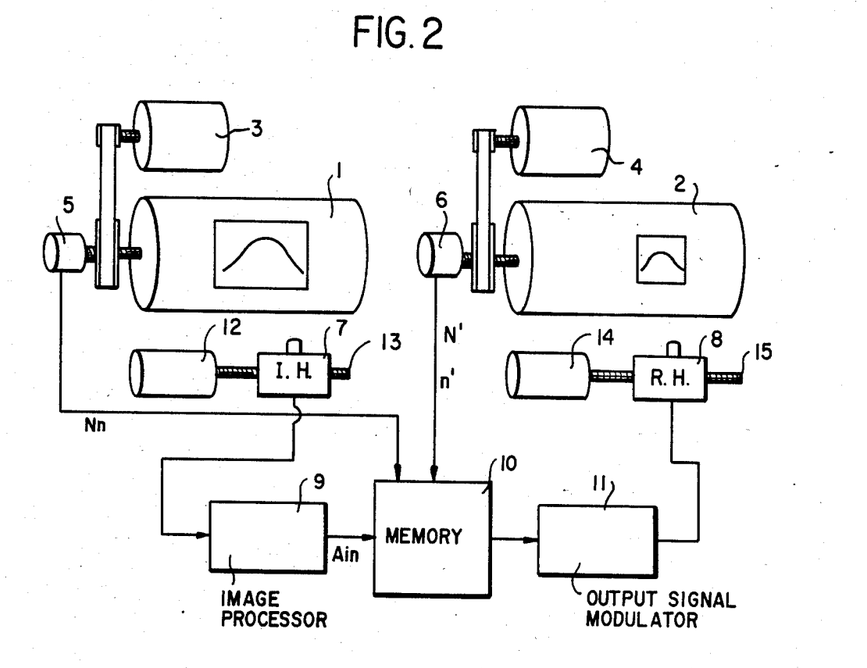
FIG. 2 is a diagram of the structure of an image reproducing system comprising a memory device of the present invention.

FIG. 2 shows a conventional image reproducing system to which the present invention is applied. An input drum 1 is rotated by main scanning motor 3, while a rotary encoder 5, coaxially connected to the input drum 1, generates one pulse signal N for each revolution of the drum, as well as a multiple pulse signal n to be applied to memory 10 described below. An input head 7 maintained against the input drum 1 is fed along a feed screw 13 by a sub-scanning motor 12 in the axial direction of the input drum 1 (the sub-scanning direction). By rotating the input drum 1 and moving the input head 7, an image mounted on the input drum 1 is scanned helically. An analog image signal obtained by the input head 7 is input to an image processor 9 to undergo color correction, gradation correction etc., and then input to the memory 10.

On the other hand, a recording drum 2 is driven by a main scanning motor 4, while a rotary encoder 6 coaxially connected to the recording drum 2 outputs a single pulse signal N' for each revolution of drum 2 as well as a multiple pulse signal n' to the memory 10 in the same manner as the rotary encoder 5.

A recording head 8 is also fed along a feed screw 15 in a sub-scanning direction. The image data stored in the memory 10 are output through an output signal modulator 11 to the recording head 8. By rotating the recording drum 2 and moving the recording head 8, a reproduction image of a desired magnification ratio can be obtained.

Figure 3:
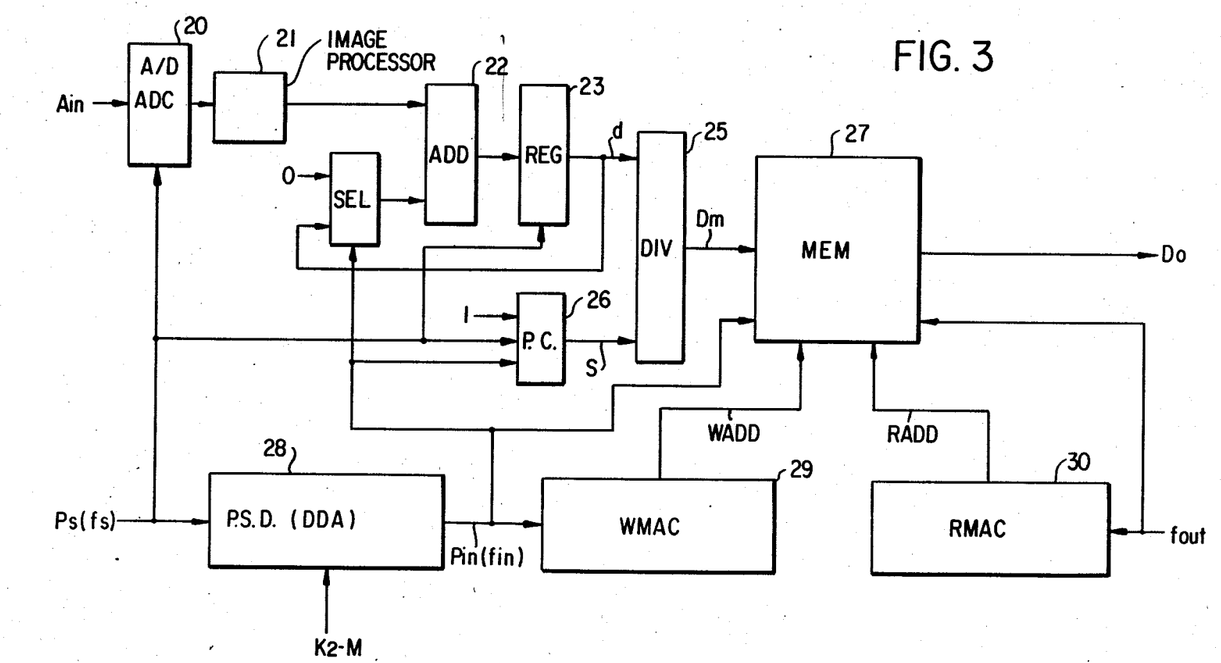
FIG. 3 is a block diagram of an embodiment of the memory shown in FIG. 2.
Figure 4:
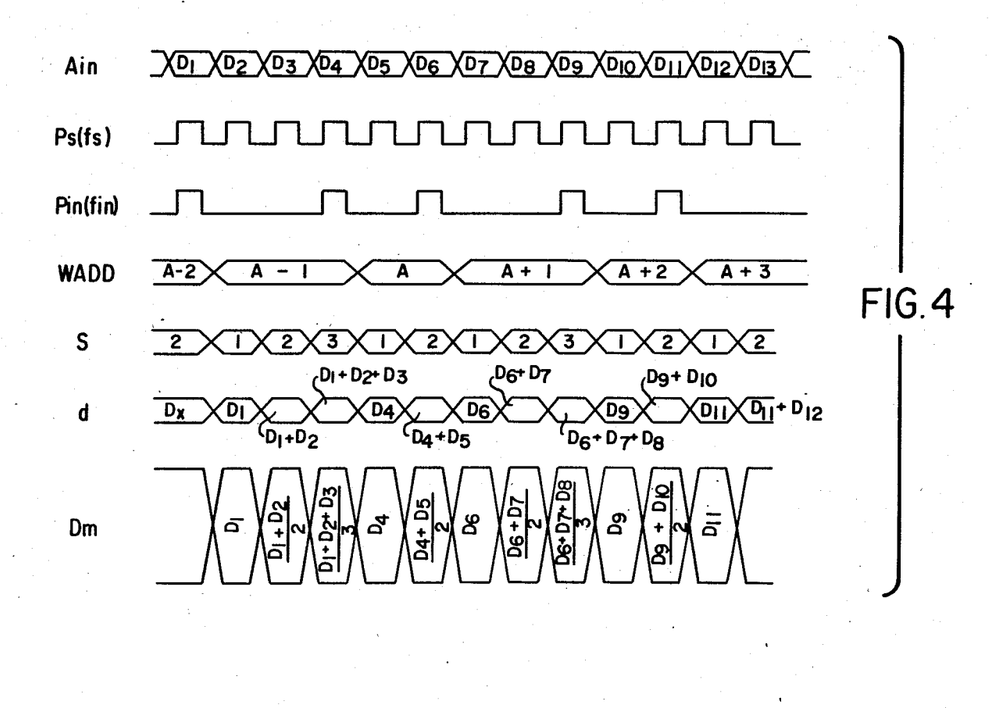
FIG. 4 is a timing diagram associated with the embodiment of FIG. 3.

A timing pulse generator (not shown) generates a sampling pulse signal $P_s$ of a frequency $f_s$, as shown in FIG. 4, in accordance with the pulses N and n obtained from the rotary encoder 5. The sampling pulse signal $P_s$ is input to an A/D converter 20 (FIG. 3) as well as to a pulse signal distributor 28.

The pulse signal distributor 28, having a well-known construction, generates a writing pulse signal $P_{in}$ of a frequency $f_{in}$ which is related by the magnification ratio to the frequency $f_s$ of the sampling pulse signal $P_s$, as indicated in the equation (2). An analog image signal $A_{in}$ from the image processor 9 is put into the A/D converter 20 to undergo an A/D conversion according to the sampling pulse signal $P_s$ and then input to another image processor 21 in a digital form.

The image data, after undergoing a gradation correction process and so forth in the image processor 21, is applied to one terminal of an adder 22. The adder 22 performs an addition between the image data and an output data of a data selector 24. The output data d of adder 22 is applied to a register 23.

The output data d are applied to one input of a divider 25 as well as to the data selector 24 one sampling pulse earlier. The data selector 24 applies to the adder 22 zero level data when the writing pulse signal $P_{in}$ is input thereto, or else the output of the register 23 to the adder. Consequently, the adder 22 sums pixel image data and zero data when the writing pulse $P_{in}$ is input thereto, or sums the result of the addition data obtained during the previous sample by the adder 22 and the image data of the next pixel.

The data d input to the divider 25 is divided by divisor data s input from a preset counter 26 in the following manner to be input to a memory 27 as image data $D_m$. The preset counter 26 sets the count thereof at 1 when a writing pulse is received, counts the count number up when sampling pulses are successively applied, and sets the count number back to 1 when the next writing pulse is input thereto. The memory 27 stores the image data $D_m$ input from the divider 25 in the addresses designated by a memory writing address signal WADD. The signal WADD is generated by a memory writing address counter 29 according to each pulse of the writing pulse signal $P_{in}$.

The thus-stored image data in the memory 27 are output as an output image data $D_0$ from the addresses designated by a memory reading address signal RADD. Address signal RADD is output from a memory reading address counter 30 according to a reading pulse signal $P_{out}$ of frequency $f_{out}$. It should be noted that the reading pulse signal $P_{out}$ is generated by a timing pulse generator (not shown) according to said pulse signals N' and n' output from the rotary encoder 6.

The timing chart shown in FIG. 4 shows a case in which $f_{in}/f_s = K_2 M = 2/5$, when the pulse signal distributor 28 outputs alternately a writing pulse $P_{in}$ every third and second sampling pulse signal $P_s$. Therefore data s become $1 \to 2 \to 3 \to 1 \to 2$, respectively. Consequently, averaged image data of three pixels and two pixels are alternately input to the memory, as shown in FIG. 4.

Figure 5:
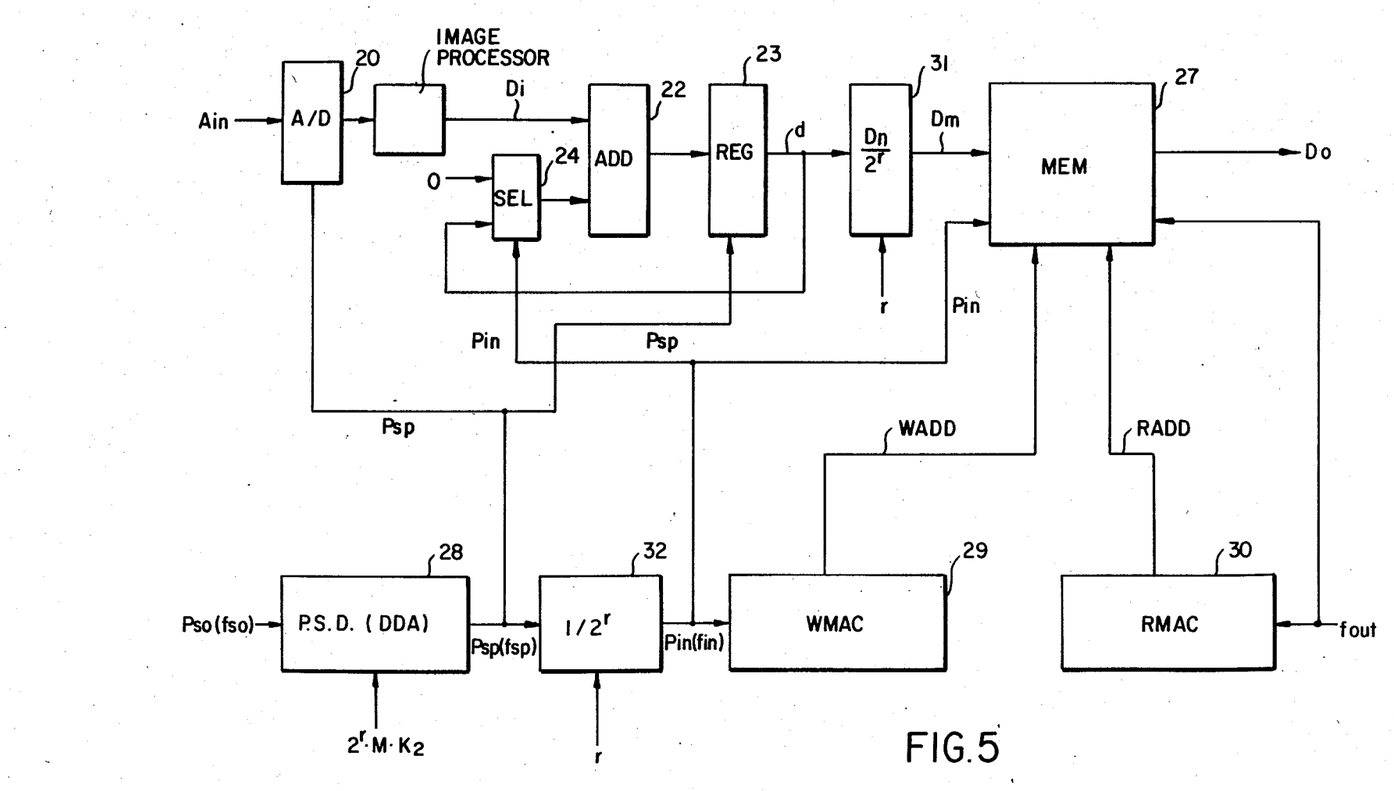
FIG. 5 is a block diagram of another embodiment of the memory shown in FIG. 2.
Figure 6:
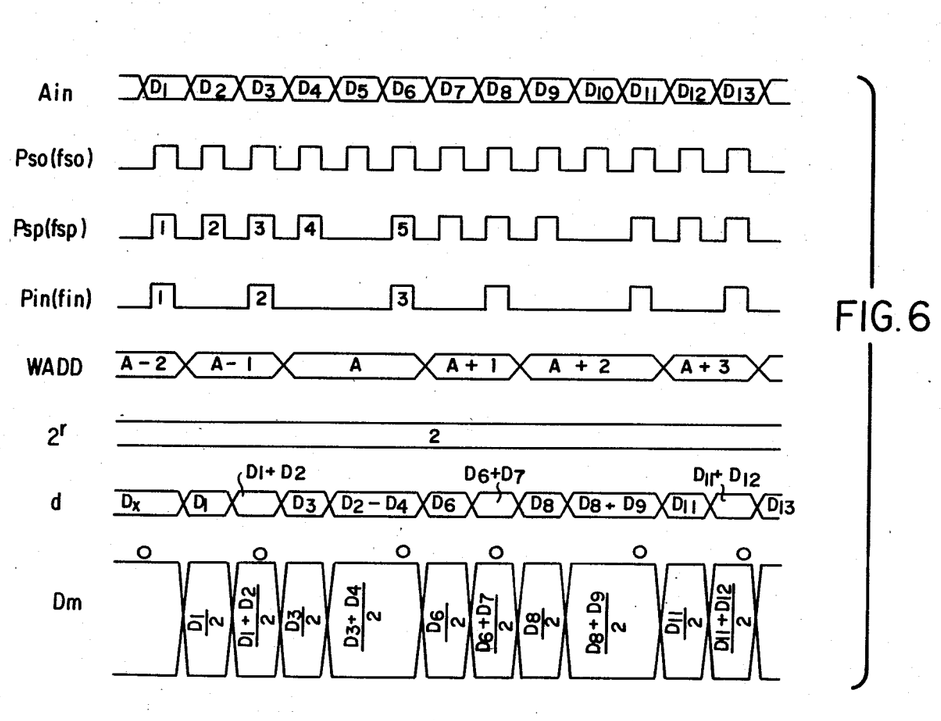
FIG. 6 is a timing diagram associated with the embodiment of FIG. 5.

FIG. 5 shows another embodiment of the present invention, while FIG. 6 shows a timing chart thereof. Since the divider 25 shown in FIG. 3 is expensive, a shift register 31 and a frequency divider 32 are used in the embodiment of FIG. 5 in place of the divider 25. However, the other units are as same as the same numbered units employed in the embodiments of FIG. 3.

It is well known that by taking the figure of a bit number I down r times, a bit number $I/2^r$ can be obtained. Taking advantage of this principle, the output of the adder 22 is divided by $2^r$ by means of the shift register 31 instead of by divider 25 of the previous embodiment. It must be noted at this juncture that since the divisor for averaging image data is limited to $2^r$, image data to be input to the adder 22 must consist of $2^r$ pixels. Accordingly, there is established between the frequency $f_{in}$ of the writing pulse $P_{in}$ and the frequency $f_{sp}$ of the sampling pulse $P_{sp}$ the relation:

$$f_{in}f_{xp}2^r \qquad (4)$$

by using said frequency divider 32 to divide the writing frequency by $\frac{1}{2}^r$. Combining equation (4) with equation (2):

$$f_{in}/f_{sp} = K_2 M = \tfrac{1}{2}^r \qquad (5)$$

from which the magnification ratio M is observed to be limited by the exponent r. Therefore, a sampling pulse signal $P_{sp}$ is obtained by said pulse signal distributor 28 from a pulse signal $P_{s0}$ of a frequency $f_{s0}$. The frequency $f_{sp}$ of the sampling pulse signal $P_{sp}$ is expressed as:

$$f_{sp} = 2^r \cdot f_{s0} \cdot M D_2 \qquad (6)$$

In the thus-contructed circuit, the magnification ratio can be arbitrarily determined by a combination of the exponent r and the frequency $f_{s0}$ of the pulse $P_{s0}$.

The timing chart of FIG. 6 shows a case in which the magnification ratio M of the embodiment of FIG. 5 is $M = 2/5$. Assuming in this case $K_2 = 1$ and $r = 1$, the frequency ratio $f_{sp}/f_{s0}$ is determined to be:

$$f_{sp}/f_{s0} = 2^r \cdot M \cdot K_2 = 4/5,$$

on which relation FIG. 6 is based. The relation is formed in the pulse signal distributor 28, while a writing pulse signal $P_{in}$ of a frequency of one-half the frequency $f_{sp}$ of the sampling pulse $P_{sp}$, is generated by the frequency divider 32.

When pixel image data $D_1$ are input to the A/D converter 20, a writing pulse signal $P_{in1}$ is applied to the data selector 24, which selects "0" data to be applied to the adder 22. Therefore, the output data d of the adder 22 becomes "$0 + D_1 = D_1$" at the leading edge of a sampling pulse $P_{sp1}$, and then the output is applied to the register 23 at the trailing edge of the sampling pulse $P_{sp1}$. When the next pixel data $D_2$ are applied to the A/D converter 20, the data $D_1$ stored in the register 23 are input by way of the data selector 24 to the adder 22. The output d of the adder 22 becomes "$D_1 + D_2$" at the leading edge of the next sampling pulse $P_{sp2}$, and then input to the register 23 at the trailing edge of the pulse $P_{sp2}$. The data are then input to the shift register 31, which outputs said data $D_m$ of the value $(D_1 + D_2)/2$. When a pixel image data $D_3$ are applied to the adder 22, a writing pulse $P_{in2}$ is applied to the data selector 24 and to the memory 27. The data selector 24 selects "0" data to be applied to the adder 22. Therefore, the output of the adder 22 becomes $D_3$ at the leading edge of the sampling pulse $P_{sp3}$, while the memory 27 at the leading edge of the writing pulse $P_{in2}$ receives the data of the value $(D_1 + D_2)/2$ stored in the register 31 at an address $A - 1$. Meanwhile the data $D_3$ is applied to the register 23 at the trailing edge of the sampling pulse $P_{sp3}$. In the same manner, data of the value $(D_3 + D_4)/2$ are applied to the register 23 at the trailing edge of the sampling pulse $P_{sp4}$. The next pixel data $D_5$ are ignored because no sampling pulse is applied to the A/D converter 20 when the pixel data $D_5$ are input thereto. Consequently, the subsequent pixel data $D_6$ are input to the register 23 at the trailing edge of the sampling pulse $P_{sp5}$. Meanwhile, the data $D_m$ of the value $(D_3 + D_4)/2$ are stored into an address A of the memory 27 at the leading edge of the write pulse $P_{in3}$. Although in the second embodiment only image data of $f_{sp}/f_{s0}$ pixels among all the pixels sampled are utilized for image reproduction, such skipped data writing does not cause any conspicuous deterioration of the quality of the reproduced image to occur.

The following is a method of converting the magnification ratio of the sub-scanning direction factor to magnification conversion of the main scanning direction.

It is now assumed that the frequency ratio of the sampling pulse signal $P_s$ and reading pulse signal $P_{in}$ is 5:1. It is also assumed that sampled image data of each pixel are submitted to the recording process without being averaged with the image data of other pixels (called a "standard state" hereinafter), and that the number of recording beams is ten.

Under the above-specified condition, in recording a reproduction image of the original size, a magnification ratio in the main scanning direction factor is, according to the present invention, carried out in such a manner that image data of every five pixels sampled in the input side is averaged to be written into the memory. The memory is read in accordance with a reading pulse signal having a frequency one-fifth of that of the sampling pulse (i.e., the frequency $f_s$ of the sampling pulse $P_s$ has a ratio of 5:1 to the frequency $f_{in}$ of the writing pulse $P_{in}$). Magnification conversion of the sub-scanning direction factor can be carried out by controlling the feeding speed of the recording head 8 to be one-fifth that of the standard state and using two of the ten recording beams thereof. It must be noted in this connection that the feeding speed of the input head 7 must be kept at said standard state.

Further assuming that the ratio of the sampling frequency $f_s$ to the writing frequency $f_{in}$ 5:2, a reproduction image can be recorded in a double magnification ratio. In this case, the magnification conversion of the sub-scanning direction factor can be attained by rendering the feeding speed of the recording head 8 to be two-fifths that of the standard state and using four of the ten recording beams thereof, when, as in the previous case, the feeding speed of the input head 7 must be kept at the standard state.

In the above case, since the feeding speed of the recording head 8 is varied according to the predetermined magnfication ratio, the densities of images to be reproduced, of course, vary. In order to resolve the above drawback, the following method can be adopted. That is, in the standard state (corresponding to a magnification ratio of five), image data of an original are scanned by one of five photo-sensors comprised in an input head 7, input to the memory, and used for driving the ten recording beams.

When a reproduction image is to be recorded in a magnification ratio of two, at first image data of one scanning line are obtained by averaging image data from two of the five photo-sensors, then image data of the next scanning line are obtained by averaging image data obtained from the other three of the five photo-sensors; finally, the above two steps are repeated. In this case the ten recording beams are all used.

As mentioned above, since the present invention is capable of maintaining the frequency ratio between a sampling pulse signal and a reading pulse signal constant regardless of the magnification ratio to be employed, the appearance of moire is considerably suppressed under a low image reproduction magnification ratio without varying the diameter of the input scanning beam because there is no need to reduce the sampling frequency.

In this disclosure, there is shown and described only the preferred embodiments of the invention, but as aforementioned, it is to be understood that the invention is capable of use in various other combinations and environments and is capable of changes or modifications within the scope of the inventive concept as expressed herein.

I claim:

1. A method for controlling image magnification ratio in an electronic image reproduction system, comprising the steps of:
    (a) scanning an original image;
    (b) sampling the original image in synchronism with a sampling pulse signal of a constant frequency $f_s$ independent of a predetermined magnification ratio to obtain corresponding digital image data;
    (c) averaging the digitized image data among a number of pixels corresponding to the magnification ratio; and
    (d) writing the image data obtained in step (c) into a memory device, the writing being synchronized with a writing pulse signal of a frequency. $f_{in} = K_2 . M . f_s$, wherein $K_2$ is a constant and M is the magnification ratio.

2. A method for controlling image magnification ratio in an electronic image reproduction system, comprising the steps of:
    (a) scanning an original image;
    (b) sampling the original image in synchronism with a sampling pulse signal of a frequency $f_{sp}$ to obtain digitized image data for writing into a memory device;
    (c) generating a writing pulse signal having a frequency $f_{in} = f_{sp}/2^r$, where r is an integer;
    (d) averaging the digitized image data every $2^r$ pixels by dividing r the magnitude of a digital signal representative of a sum of image data of $2^r$ pixels;
    (e) writing the averaged image data obtained in step (d) into the memory in synchronism with the writing pulse signal of the frequency $f_{in} = f_{s0} \times K_2 . M$, where M is the magnification ratio and $f_{s0}$ is a constant sampling frequency independent of the magnification ratio; and
    (f) subjecting the image data written in the memory device to a recording process by reading it synchronizing with a reading pulse signal of a frequency being constant and independent of the magnification ratio.

3. A variable magnification ratio, image reproduction system, comprising:
    (a) means for scanning an input image;
    (b) means for sampling scanned image data in synchronism with a sampling pulse signal of a constant frequency $f_s$ independent of the magnification ratio;
    (c) A/D converter means for converting sampled image data to corresponding digital image data;
    (d) averaging means for averaging the digitized image data among a number of pixels corresponding to the magnification ratio;
    (e) means for generating a writing pulse signal of a frequency related to the frequency of the sampling pulse signal and to the magnification ratio;
    (f) means for generating a reading pulse signal having a constant frequency independent of the magnification ratio;
    (g) memory means into which the image data obtained by the averaging means is applied synchronously with the writing pulse signal and from which the image data are read in synchronism with the reading pulse signal; and
    (h) means for applying the reading and writing pulse signals to the memory means.

4. A system as recited in claim 3, wherein the averaging means comprises:
    (i) an adder for summing (1) image data successively input thereto synchronized with the sampling pulse signal and (2) processed image data input thereto;
    (ii) a register for storing the output of the adder;
    (iii) a data selector developing selectively a zero signal when a writing pulse is input thereto and an output of said register for providing said processed image data;

(iv) a counter whose count number is set back to 1 when a writing pulse is input thereto or increased by one every time a sampling pulse is input thereto; and (v) a frequency divider for dividing the data output from the register by an output of said counter.

5. A system as recited in claim 3 in which the writing pulse generating means is a pulse signal distributor.

6. A variable magnification ratio, electronic image processing system, comprising:

(a) means for scanning an original image;

(b) means for sampling the original image in synchronism with a sampling pulse signal to develop corresponding digital image data;

(c) averaging means for averaging the digitized image data among $2^r$ pixels, where r is an integer, by dividing by r the sum of image data corresponding to $2^r$ pixels;

(c) a writing pulse signal generating means for generating said writing pulse signal of a frequency $f_{sp} = f_{s0} \times K_2 \cdot M$, where $K_2$ is a constant, M is the magnification ratio and $f_{s0}$ is a constant reference sampling frequency independent of the magnification ratio;

(e) memory means into which the image data obtained by the averaging means is input synchronizing with a writing pulse signal output from a writing pulse signal generating means and from which the image data are read synchronizing with a reading pulse signal whose frequency being constant regardless of a magnification ratio determined; and (f) sampling pulse signal generating means for generating the sampling pulse at a frequency $2^r f_{sp}$.

7. The system as recited in claim 6 in which the averaging means comprises:

(i) an adder for summing image data successively input thereto synchronized with the sampling pulse signal and processed image data input thereto;

(ii) a register for storing the output of the adder;

(iii) a data selector which develops as the processed image data a zero signal when a writing pulse signal is input thereto or an output of said register; and (iv) a shift register for shifting the data input from the register r times in synchronism with the sampling pulse.

8. A system as recited in claim 6 in which the sampling pulse generating means is a pulse signal distributor.

9. A system as recited in claim 6 in which the writing pulse signal generating means comprises a pulse signal distributor and a frequency divider for dividing the frequency of the output of the pulse signal distributor by $\frac{1}{2}r$.

* * * * *